United States Patent
Lee et al.

(10) Patent No.: US 12,529,760 B2
(45) Date of Patent: Jan. 20, 2026

(54) APPARATUS AND METHOD FOR GENERATING SIGNAL WITH NON-TRACKER

(71) Applicant: AGENCY FOR DEFENSE DEVELOPMENT, Daejeon (KR)

(72) Inventors: Junghoon Lee, Daejeon (KR); Byungkoo Park, Daejeon (KR); Jeil Jo, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 336 days.

(21) Appl. No.: 18/335,191

(22) Filed: Jun. 15, 2023

(65) Prior Publication Data
US 2024/0077580 A1 Mar. 7, 2024

(30) Foreign Application Priority Data
Sep. 1, 2022 (KR) .................. 10-2022-0110910

(51) Int. Cl.
*G01S 7/36* (2006.01)
*G01S 7/292* (2006.01)

(52) U.S. Cl.
CPC ............ *G01S 7/36* (2013.01); *G01S 7/2922* (2013.01)

(58) Field of Classification Search
CPC ................................. G01S 7/36; G01S 7/2922
USPC ........................................................... 342/17
See application file for complete search history.

(56) References Cited

U.S. PATENT DOCUMENTS

| | | | | |
|---|---|---|---|---|
| 3,947,848 A * | 3/1976 | Carnahan | ............... | G01S 7/2813 342/16 |
| 4,307,400 A * | 12/1981 | Miley | ........................ | G01S 7/38 342/14 |
| 5,027,121 A * | 6/1991 | Hulland | ..................... | G01S 7/36 342/16 |
| 6,433,730 B1 * | 8/2002 | Borla | ...................... | G01S 7/2922 342/197 |
| 10,263,726 B2 | 4/2019 | Breuer et al. | | |
| 10,574,383 B1 * | 2/2020 | Lee | ......................... | H04K 3/224 |

(Continued)

FOREIGN PATENT DOCUMENTS

| | | | | |
|---|---|---|---|---|
| FR | 2625324 A1 * | 6/1989 | ........... | G01S 13/524 |
| JP | 2000111637 A * | 4/2000 | | |
| JP | 2013195156 A | 9/2013 | | |

(Continued)

*Primary Examiner* — William Kelleher
*Assistant Examiner* — Samarina Makhdoom
(74) *Attorney, Agent, or Firm* — Dilworth & Barrese, LLP.; Michael J. Musella, Esq.

(57) ABSTRACT

An apparatus for generating a signal with a non-tracker includes a video signal detecting unit detecting a video signal from a reception signal and outputting a video signal exceeding a threshold, an additional noise generating unit mixing the reception signal with additional noise and outputting the reception signal mixed with the additional noise, a stored signal processing unit storing and outputting the reception signal mixed with the additional noise when the video signal exceeding the threshold is input, and a transmission signal gain controller combining a first signal, which is the reception signal mixed with the additional noise transmitted from the additional noise generating unit, and a second signal stored in and output from the stored signal processing unit, and outputting a combined signal.

15 Claims, 7 Drawing Sheets

(56) References Cited

U.S. PATENT DOCUMENTS

2001/0024170 A1\* 9/2001 Huff ..................... F42C 13/042
342/16

FOREIGN PATENT DOCUMENTS

| KR | 101967886 B1 | 4/2019 |
|----|--------------|--------|
| KR | 102293881 B1 | 8/2021 |
| KR | 102342749 B1 | 12/2021 |

\* cited by examiner reception signal video signal signal mixed with additional noise

APPARATUS AND METHOD FOR GENERATING SIGNAL WITH NON-TRACKER

CROSS-REFERENCE TO RELATED APPLICATION

This application claims priority to and the benefit of Korean Patent Application No. 10-2022-0110910 filed in the Korean Intellectual Property Office on Sep. 1, 2022, the entire contents of which are incorporated herein by reference.

BACKGROUND

(a) Field

Embodiments of the present invention relates to an apparatus and method for generating a signal with a non-tracker corresponding to a pulse signal of a radar.

(b) Description of the Related Art

Anti-aircraft radar systems acquire the Doppler of a moving object and estimate a speed of the moving object. At this time, the anti-aircraft radar systems use high period repetition frequency (HPRF). The HPRF has a very short pulse period and short pulse width in order to acquire Doppler information in a frequency domain. Accordingly, Doppler information of tens to hundreds of KHz may be acquired in the frequency domain by using the HPRF. However, distance ambiguity occurs due to the short pulse period of the HPRF. In order to compensate for these disadvantages, the anti-aircraft radar system uses a method of extending a target detection range by using a stagger having a changing pulse period.

In electronic warfare, a receiver may respond to changes in the short pulse width and pulse period of the anti-aircraft radar system by analyzing and tracking the pulse period. The receiver uses a digital radio frequency memory (DRFM) that stores and reproduces a reception signal when responding to electronic warfare using tracking after HPRF analysis is completed. Since HPRF has a very short period, it has almost the same characteristics as a continuous wave, so in the case of using DRFM to respond to electronic warfare, it may be difficult to respond to multiple HPRFs by time-division of DRFM. In addition, in the case of HPRF using multi-stagger, it is not easy to analyze the receiver, and in this case, it may not be possible to respond to electronic warfare by tracking.

SUMMARY

Embodiments of the present invention attempts to provide an apparatus and method for generating a signal with a non-tracker corresponding to a pulse signal of a radar.

According to an exemplary embodiment, an apparatus for generating a signal with a non-tracker includes: a video signal detecting unit detecting a video signal from a reception signal and outputting a video signal exceeding a threshold; an additional noise generating unit mixing the reception signal with additional noise and outputting the reception signal mixed with the additional noise; a stored signal processing unit storing and outputting the reception signal mixed with the additional noise when the video signal exceeding the threshold is input; and a transmission signal gain controller combining a first signal, which is the reception signal mixed with the additional noise transmitted from the additional noise generating unit, and a second signal stored in and output from the stored signal processing unit, and outputting a combined signal.

The apparatus may further include: a first signal distributor distributing and inputting the reception signal to the video signal detecting unit and the additional noise generating unit.

The apparatus may further include: a signal generating controller adjusting the threshold and selecting a bandwidth of the additional noise.

The stored signal processing unit may store and simultaneously output the reception signal mixed with the additional noise in a first-in-first-out manner.

The transmission signal gain controller may adjust a gain of each of the first signal and the second signal, combine the first signal and the second signal, and then output the combined signal.

The transmission signal gain controller may combine the first signal and the second signal so that the first signal is output first and then the second signal is output.

The second signal may be reproduced and maintained continuously after the first signal.

The additional noise generating unit may include: a first gain controller adjusting a gain of the reception signal; a noise generating unit generating the additional noise; a first mixer mixing the additional noise to the reception signal output from the first gain controller; a second signal distributor dividedly outputting the reception signal mixed with the additional noise through the first mixer into two paths; and a second gain controller adjusting a gain of one reception signal mixed with the additional noise output from the second signal distributor and transferring a gain-adjusted reception signal to the stored signal processing unit.

According to another exemplary embodiment, a method for generating a signal with a non-tracker by an apparatus for generating a signal includes: distributing a reception signal to a first path and a second path; mixing additional noise to the reception signal distributed to the second path, and distributing the reception signal mixed with the additional noise to a third path and a fourth path; detecting a video signal from the reception signal distributed to the first path; storing and outputting the reception signal mixed with the additional noise of the third path when the video signal exceeds a threshold; and combining a first signal, which is a reception signal mixed with additional noise of the fourth path, and a second signal stored in and output from the third path, and outputting a combined signal.

After a gain of the reception signal distributed to the second path is adjusted, the additional noise may be mixed to generate the reception signal mixed with the additional noise.

A gain of the reception signal mixed with the additional noise of the third path may be adjusted.

The video signal exceeding the threshold may be output, the reception signal mixed with the additional noise of the third path may be stored using the video signal exceeding the threshold as a trigger signal, and the stored signal may be simultaneously output.

The reception signal mixed with the additional noise of the third path may be stored and simultaneously output in a first-in-first-out manner.

After a gain of each of the first signal and the second signal is adjusted, the first signal and the second signal may be combined.

The first signal and the second signal may be combined so that the first signal is output first and then the second signal is output.

The second signal may be reproduced and maintained continuously after the first signal.

The apparatus and method for generating a signal with a non-tracker according to an exemplary embodiment may respond to electronic warfare by generating a jamming signal in a non-tracking manner even when an anti-aircraft radar system uses HPRF using a multi-stagger.

DETAILED DESCRIPTION

Figure 1:
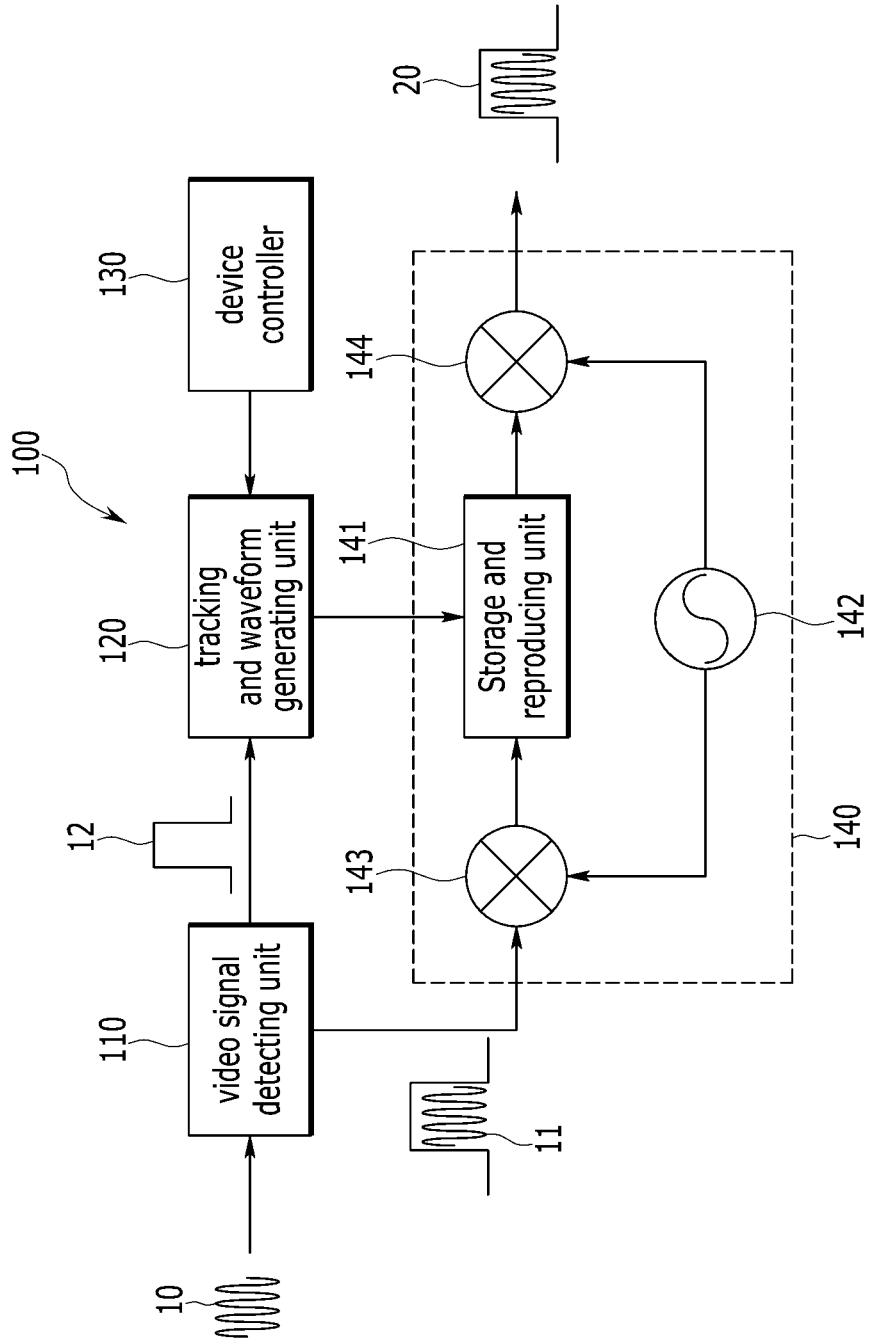
FIG. 1 is a block diagram illustrating an apparatus for generating a signal with a tracker according to an exemplary embodiment.

Embodiments of the present invention will be described in detail below with reference to the accompanying drawings so that those skilled in the art to which the present invention pertains may easily carry out the embodiments. The present invention may be embodied in many different forms and is not limited to the embodiments described herein.

Portions unrelated to the description may be omitted in order to more clearly describe the present invention, and the same or similar components may be denoted by the same reference numerals throughout the present specification.

Throughout the specification, when a part is referred to "include" a certain element, it means that it may further include other elements rather than exclude other elements, unless specifically indicates otherwise.

FIG. 1 is a block diagram illustrating an apparatus for generating a signal with a tracker according to an exemplary embodiment.

Referring to FIG. 1, an apparatus 100 for generating a signal with a tracker includes a video signal detecting unit 110, a tracking and waveform generating unit 120, a device controller 130, and a digital radio frequency memory (DRFM) 140. The digital radio frequency memory 140 may include a storage and reproducing unit 141, a local oscillator 142, a first mixer 143, and a second mixer 144.

When a reception signal 10 is received, the video signal detecting unit 110 may detect a video signal 12 and input the video signal 12 to the tracking and waveform generating unit 120. The reception signal 10 may be a pulse signal emitted from a radar system. Also, the video signal detecting unit 110 may output a radio signal 11 corresponding to the reception signal 10 and input the radio signal 11 to the digital radio frequency memory 140. The radio signal 11 input to the digital radio frequency memory 140 may be used for storage and reproduction.

The tracking and waveform generating unit 120 has a function of tracking a signal and generating a waveform. The device controller 130 may transmit a control command to the tracking and waveform generating unit 120 to store the reception signal 10 and generate a signal, and the tracking and waveform generating unit 120 may allow the radio signal 11 to be stored in the digital radio frequency memory 140 according to the control command from the device controller 130.

The storage and reproducing unit 141 may store a signal in which the radio signal 11 and noise generated by the local oscillator 142 are mixed through the first mixer 143

At this time, the storage and reproducing unit 141 may store the signal according to a control signal from the tracking and waveform generating unit 120.

The tracking and waveform generating unit 120 may perform a tracking function by analyzing the video signal 12 output from the video signal detecting unit 110. The tracking and waveform generating unit 120 may reproduce a signal stored in the storage and reproducing unit 141 using the control signal at a time predicted by the tracking function.

The signal reproduced by the storage and reproducing unit 141 may be output as an output signal 20 mixed with noise generated in the local oscillator 142 through the second mixer 144.

The apparatus 100 for generating a signal with a tracker may be difficult to respond to multiple high period repetition frequencies (HPRFs). The anti-aircraft radar system may use a multi-stagger in which a pulse period is changed, and in this case, the apparatus 100 for generating a signal with a tracker cannot respond to electronic warfare by tracking.

Hereinafter, an apparatus and method for generating a signal with a non-tracker according to an exemplary embodiment of the present invention will be described with reference to FIGS. 2 to 7.

Figure 2:
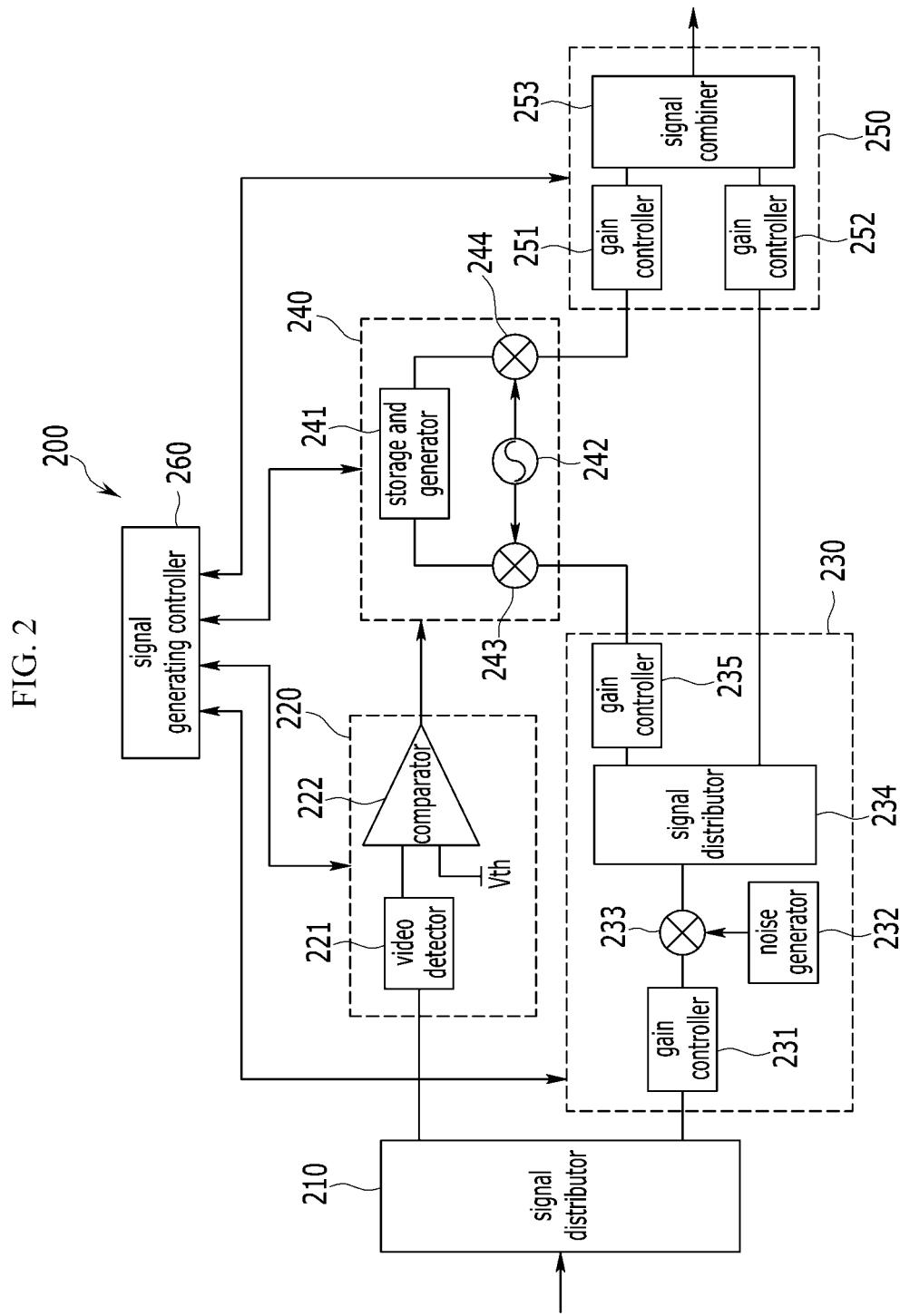
FIG. 2 is a block diagram illustrating an apparatus for generating a signal with a non-tracker according to an exemplary embodiment of the present invention.

FIG. 2 is a block diagram illustrating a apparatus for generating a signal with a non-tracker according to an exemplary embodiment of the present invention.

Referring to FIG. 2, the apparatus 200 for generating a signal with a non-tracker may include a first signal distributor 210, a video signal detecting unit 220, an additional noise generating unit 230, a stored signal processing unit 240, a transmission signal gain controller 250, and a signal generating controller 260.

The first signal distributor 210 may receive a reception signal (see FIG. 4), distribute and input the reception signal to the video signal detecting unit 220 and the additional noise generating unit 230. In other words, the first signal distributor 210 may distribute the reception signal to a first path of the video signal detecting unit 220 and a second path of the additional noise generating unit 230. The reception signal may be a pulse signal emitted from a radar system and may be an HPRF signal using a multi-stagger.

The video signal detecting unit 220 may detect a video signal from the reception signal input from the first signal distributor 210 and output a video signal exceeding a threshold Vth (see FIG. 5) to the stored signal processing unit 240.

The video signal detecting unit 220 may include a video detector 221 and a comparator 222. The video detector 221 may receive the reception signal from the first signal distributor 210 and detect a video signal. The comparator 222 may receive the video signal detected by the video detector 221 and output a video signal exceeding the threshold Vth to the stored signal processing unit 240. The threshold Vth may be set to an appropriate value for controlling storage and output of signals in the stored signal processing unit 240.

The additional noise generating unit 230 may mix (add) additional noise to the reception signal input from the first signal distributor 210 and output the mixed signal.

The additional noise generating unit 230 may include a first gain controller 231, a noise generator 232, a first mixer 233, a second signal distributor 234, and a second gain controller 235. The first gain controller 231 may receive the reception signal from the first signal distributor 210, adjust a gain of the reception signal, and input the gain-adjusted reception signal to the first mixer 233. The noise generator 232 may generate additional noise and input the additional noise to the first mixer 233. The first mixer 233 may mix the additional noise to the reception signal output from the first gain controller 231. The additional noise may be mixed with the reception signal through the first mixer 233, and the reception signal mixed with the additional noise may be input to the second signal distributor 234. The second signal distributor 234 may dividedly output the reception signal mixed with the additional noise to two paths (a third path and a fourth path). One reception signal mixed with additional noise output from the second signal distributor 234 may be input to the stored signal processing unit 240 of the third path through the second gain controller 235. In addition, another reception signal mixed with additional noise output from the second signal distributor 234 may be input to the transmission signal gain controller 250 of the fourth path. The second gain controller 235 may adjust a gain of the reception signal mixed with additional noise and transmit the signal to the stored signal processing unit 240.

When a video signal exceeding the threshold Vth is input from the video signal detecting unit 220, the stored signal processing unit 240 may store the reception signal (see FIG. 6) mixed with additional noise input from the additional noise generating unit 230 and output the same. The stored signal processing unit 240 may store and simultaneously output the reception signal mixed with additional noise in a first in first out (FIFO) manner. That is, the stored signal processing unit 240 does not operate under control based on tracking and prediction, unlike digital radio frequency memory (DRFM).

The stored signal processing unit 240 may include a storage and generator 241, a local oscillator 242, a second mixer 243, and a third mixer 244. The second mixer 243 may mix the reception signal, which has been mixed with additional noise input from the additional noise generating unit 230, with the signal generated by the local oscillator 242 and transmit the mixed signal to the storage and generator 241. When a video signal exceeding the threshold Vth is input from the video signal detecting unit 220, the storage and generator 241 may store the signal input through the second mixer 243 and simultaneously output the stored signal. The signal output from the storage and generator 241 may be mixed with the signal generated by the local oscillator 242 through the third mixer 244 and transmitted to the transmission signal gain controller 250.

The transmission signal gain controller 250 may control a gain of each of the reception signal (a first signal) mixed with the additional noise transferred from the additional noise generating unit 230 and a gain of the signal stored in and output from the stored signal processing unit 240 (a second signal), combine the first signal and the second signal, and then output a combined signal. A signal output from the transmission signal gain controller 250 may be a jamming signal corresponding to a pulse signal of a radar system.

The transmission signal gain controller 250 may include a third gain controller 251, a fourth gain controller 252 and a signal combiner 253. The third gain controller 251 may control the gain of the second signal transferred from the stored signal processing unit 240 and transmit the same to the signal combiner 253. The fourth gain controller 252 may control the gain of the first signal mixed with the additional noise transferred from the additional noise generating unit 230, and transmit the same to the signal combiner 253. The signal combiner 253 may combine the first signal and the second signal each having the controlled gain, and output the same. The signal combiner 253 may combine the first signal and the second signal so that the first signal mixed with the additional noise is first output and then the second signal transferred from the stored signal processing unit 240 is output (see FIG. 7). That is, the second signal stored in and output from the stored signal processing unit 240 may be reproduced and maintained continuously after the first signal.

The signal generating controller 260 may control each of the video signal detecting unit 220, the additional noise generating unit 230, the stored signal processing unit 240, and the transmission signal gain controller 250. The signal generating controller 260 may adjust the threshold Vth by transmitting a threshold control command to the video signal detecting unit 220. The signal generating controller 260 may transfer a noise bandwidth selection and gain control command to the additional noise generating unit 230 to select a bandwidth of the additional noise generated by the noise generator 232, and set a gain of each of the first gain controller 231 and the second gain controller 235. The signal generating controller 260 may transmit storage and generating control command to the stored signal processing unit 240 to turn on/off the operation of the stored signal processing unit 240. That is, when the storage and generating control command is input as ON and a video signal exceeding the threshold Vth is input from the video signal detection unit 220, the stored signal processing unit 240 may store and output the signal mixed with the additional noise input from the additional noise generating unit 230. The signal generating controller 260 may transmit a transmission signal gain control command to the transmission signal gain controller 250 to set gains of the third gain controller 251 and the fourth gain controller 252.

Hereinafter, a method for generating a signal with a non-tracker using the apparatus 200 for generating a signal with a non-tracker will be described with reference to FIGS. 3 to 7.

Figure 3:
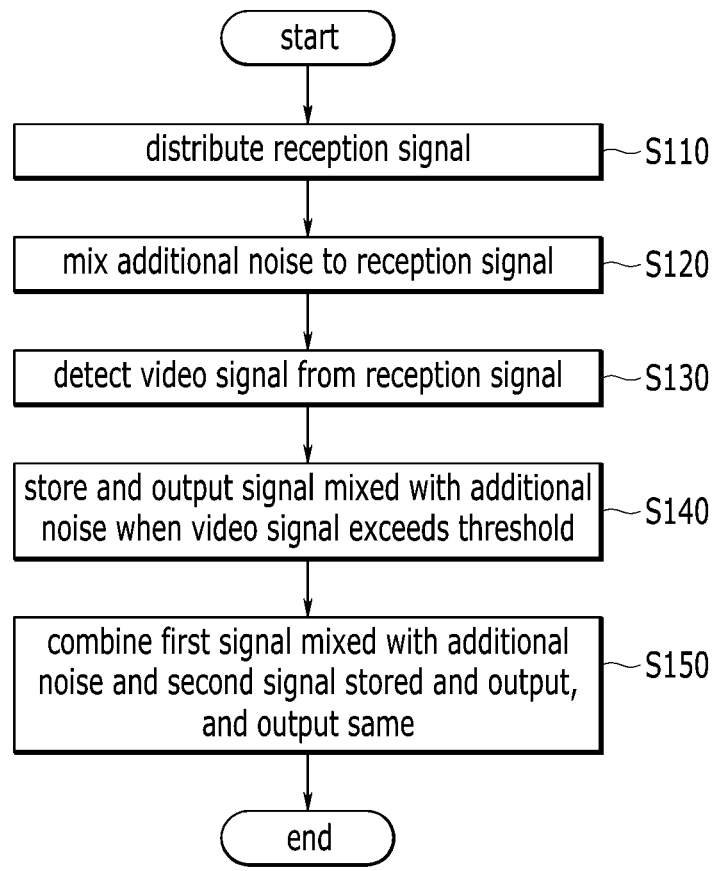
FIG. 3 is a flowchart illustrating a method for generating a signal with a non-tracker according to an exemplary embodiment of the present invention.
Figure 4:
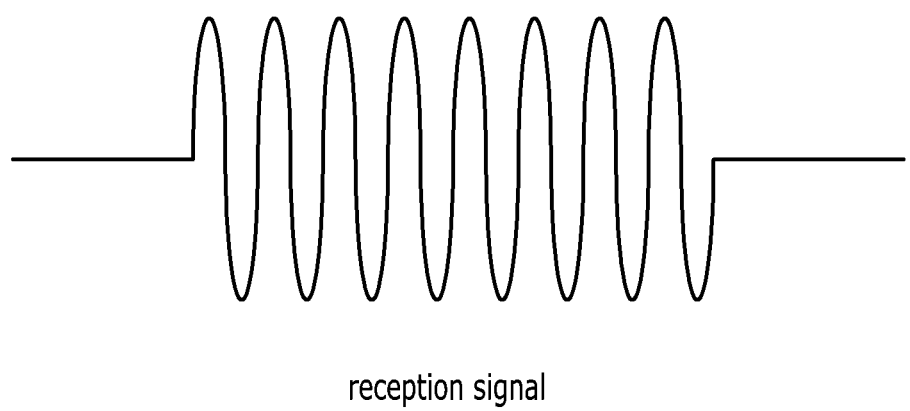
FIG. 4 illustrates a reception signal according to an exemplary embodiment.
Figure 5:
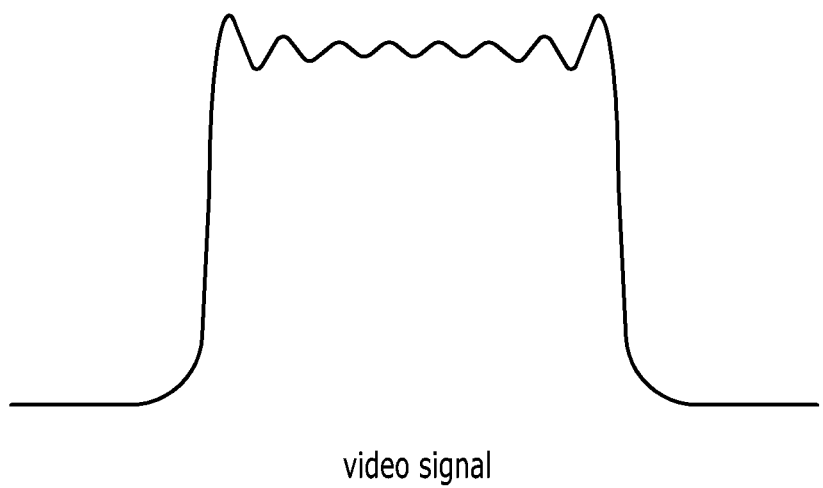
FIG. 5 illustrates a video signal according to an exemplary embodiment.
Figure 6:
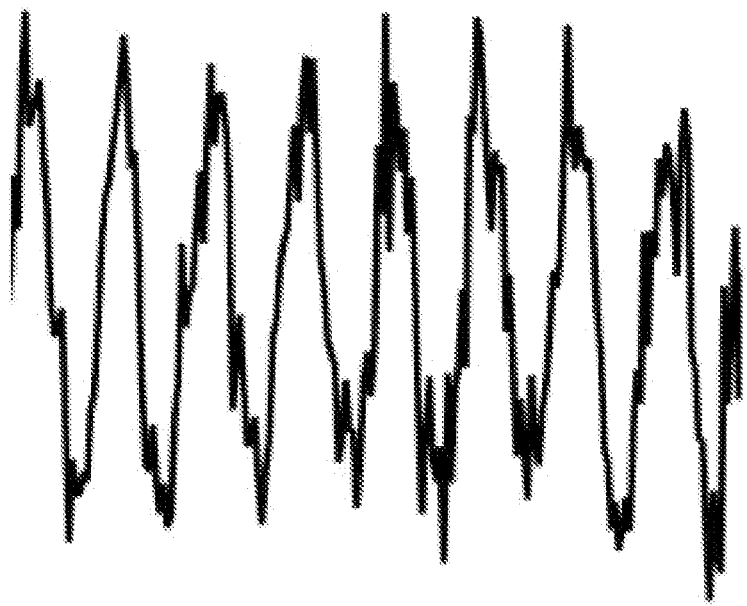
FIG. 6 illustrates a signal mixed with additional noise according to an exemplary embodiment.
Figure 7:
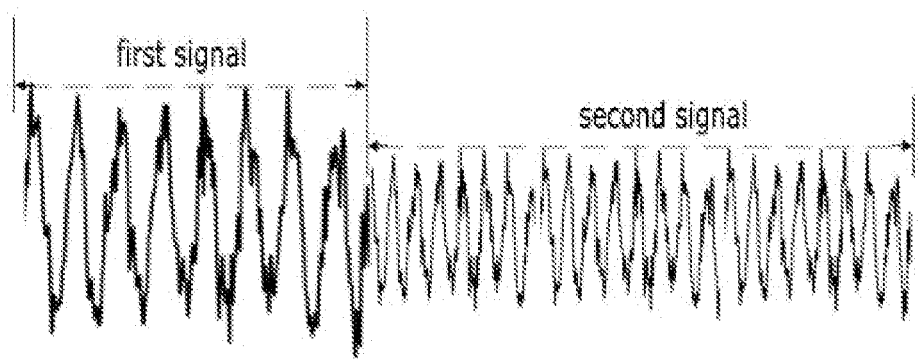
FIG. 7 illustrates a signal that is output by combining a first signal mixed with additional noise and a second signal that is stored and output according to an exemplary embodiment.

FIG. 3 is a flowchart illustrating a method for generating a signal with a non-tracker according to an exemplary embodiment of the present invention. FIG. 4 illustrates a reception signal according to an exemplary embodiment. FIG. 5 illustrates a video signal according to an exemplary embodiment. FIG. 6 illustrates a signal mixed with additional noise according to an exemplary embodiment. FIG. 7 illustrates a signal that is output by combining a first signal mixed with additional noise and a second signal that is stored and output according to an exemplary embodiment.

Referring to FIGS. 3 to 7, the apparatus 200 for generating a signal with a non-tracker may distribute a reception signal to a first path and a second path (S110). The first path may be a path for detecting a video signal, and the second path may be a path for mixing additional noise. As shown in FIG.

4, the reception signal may be a pulse signal radiated from a radar system or may be an HPRF signal using a multi-stagger.

The apparatus 200 for generating a signal with a non-tracker may mix the reception signal distributed to the second path with additional noise (S120). At this time, the apparatus 200 for generating a signal with a non-tracker may adjust a gain of the reception signal and mix additional noise to the reception signal to generate the reception mixed with additional noise. The reception signal mixed with the additional noise may be distributed to the third path and the fourth path. The third path may be a path for storing and outputting the reception signal mixed with the additional noise, and the apparatus 200 for generating a signal with a non-tracker may adjust a gain of the reception signal mixed with the additional noise of the third path and then store and output the reception signal mixed with the additional noise. The fourth path is a path for combining the reception signal mixed with additional noise, and the reception signal mixed with additional noise of the fourth path is referred to as a first signal.

The apparatus 200 for generating a signal with a non-tracker may detect a video signal from the reception signal distributed to the first path (S130). The apparatus 200 for generating a signal with a non-tracker may output a video signal exceeding the threshold Vth by using the comparator 222. As illustrated in FIG. 5, the video signal exceeding the threshold Vth may be a signal having a high level only in a portion exceeding the threshold Vth, and may be used as a trigger signal for storing and outputting the signal.

When the detected video signal exceeds the threshold, the apparatus 200 for generating a signal with a non-tracker may store and output the reception signal mixed with additional noise of the third path (S140). The apparatus 200 for generating a signal with a non-tracker may store the reception signal mixed with the additional noise of the third path and simultaneously output the stored signal, using the video signal exceeding the threshold Vth as a trigger signal. The apparatus 200 for generating a signal with a non-tracker may store and simultaneously output the reception signal mixed with the additional noise of the third path in a first-in-first-out manner. As illustrated in FIG. 6, the reception signal mixed with the additional noise may have a waveform modulated by the additional noise.

The apparatus 200 for generating a signal with a non-tracker may combine the first signal, which is the reception signal mixed with the additional noise of the fourth path, and the second signal stored in and output from the third path and output the same (S150). At this time, the apparatus 200 for generating a signal with a non-tracker may adjust a gain of each of the first signal and the second signal, combine the first signal and the second signal, and then output the same. As illustrated in FIG. 7, the apparatus 200 for generating a signal with a non-tracker may first output the first signal mixed with additional noise and then output the second signal. The second signal may be reproduced and maintained continuously after the first signal.

In this way, the non-tracking signal generating apparatus 200 and method continuously output the first signal and the second signal in a non-tracking manner even when the anti-aircraft radar system uses HPRF using a multi-stagger to respond to electronic warfare.

The drawings referred to and the detailed descriptions of the present invention are merely illustrative and have been used to describe the present invention but not intended to limit the scope of the present invention described in claims. Thus, a person skilled in the art may easily select therefrom to replace the same. Accordingly, the true scope of the present invention should be determined by the technical idea of the appended claims.

What is claimed is:

1. An apparatus for generating a signal with a non-tracker, the apparatus comprising:
   a video signal detecting unit detecting a video signal from a reception signal and outputting a video signal exceeding a threshold;
   an additional noise generating unit mixing the reception signal with additional noise and outputting the reception signal mixed with the additional noise;
   a stored signal processing unit storing and outputting the reception signal mixed with the additional noise when the video signal exceeding the threshold is input; and
   a transmission signal gain controller combining a first signal, which is the reception signal mixed with the additional noise transmitted from the additional noise generating unit, and a second signal stored in and output from the stored signal processing unit, and outputting a combined signal, wherein:
   the additional noise generating unit includes:
   a first gain controller adjusting a gain of the reception signal;
   a noise generating unit generating the additional noise;
   a first mixer mixing the additional noise to the reception signal output from the first gain controller;
   a second signal distributor dividedly outputting the reception signal mixed with the additional noise through the first mixer into two paths; and
   a second gain controller adjusting a gain of one reception signal mixed with the additional noise output from the second signal distributor and transferring a gain-adjusted reception signal to the stored signal processing unit.

2. The apparatus of claim 1, further comprising:
   a first signal distributor distributing and inputting the reception signal to the video signal detecting unit and the additional noise generating unit.

3. The apparatus of claim 1, further comprising:
   a signal generating controller adjusting the threshold and selecting a bandwidth of the additional noise.

4. The apparatus of claim 1, wherein:
   the stored signal processing unit stores and simultaneously outputs the reception signal mixed with the additional noise in a first-in-first-out manner.

5. The apparatus of claim 1, wherein:
   the transmission signal gain controller adjusts a gain of each of the first signal and the second signal, combines the first signal and the second signal, and then outputs the combined signal.

6. The apparatus of claim 1, wherein:
   the transmission signal gain controller combines the first signal and the second signal so that the first signal is output first and then the second signal is output.

7. The apparatus of claim 1, wherein:
   the second signal is reproduced and maintained continuously after the first signal.

8. A method for generating a signal with a non-tracker, the method comprising:
   distributing a reception signal to a first path and a second path;
   mixing additional noise generated from an additional noise generation unit to the reception signal distributed to the second path, and distributing the reception signal mixed with the additional noise to a third path and a fourth path;

detecting a video signal from the reception signal distributed to the first path;

storing and outputting the reception signal mixed with the additional noise of the third path when the video signal exceeds a threshold; and combining a first signal, which is a reception signal mixed with additional noise of the fourth path, and a second signal stored in and output from the third path, and outputting a combined signal, wherein: the additional noise generating unit includes:

a first gain controller adjusting a gain of the reception signal;

a noise generating unit generating the additional noise;

a first mixer mixing the additional noise to the reception signal output from the first gain controller;

a second signal distributor dividedly outputting the reception signal mixed with the additional noise through the first mixer into two paths; and a second gain controller adjusting a gain of one reception signal mixed with the additional noise output from the second signal distributor and transferring a gain-adjusted reception signal to the stored signal processing unit.

9. The method of claim 8, wherein:

after a gain of the reception signal distributed to the second path is adjusted, the additional noise is mixed to generate the reception signal mixed with the additional noise.

10. The method of claim 8, wherein:

a gain of the reception signal mixed with the additional noise of the third path is adjusted.

11. The method of claim 8, wherein:

the video signal exceeding the threshold is output, the reception signal mixed with the additional noise of the third path is stored using the video signal exceeding the threshold as a trigger signal, and the stored signal is simultaneously output.

12. The method of claim 8, wherein:

the reception signal mixed with the additional noise of the third path is stored and simultaneously output in a first-in-first-out manner.

13. The method of claim 8, wherein:

after a gain of each of the first signal and the second signal is adjusted, the first signal and the second signal are combined.

14. The method of claim 8, wherein:

the first signal and the second signal are combined so that the first signal is output first and then the second signal is output.

15. The method of claim 8, wherein:

the second signal is reproduced and maintained continuously after the first signal.

\* \* \* \* \*